US008769319B2

(12) United States Patent
Yang

(10) Patent No.: US 8,769,319 B2
(45) Date of Patent: Jul. 1, 2014

(54) REDUCING POWER CONSUMPTION IN MEMORY LINE ARCHITECTURE

(75) Inventor: Jung Woong Yang, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 270 days.

(21) Appl. No.: 13/313,734

(22) Filed: Dec. 7, 2011

(65) Prior Publication Data

US 2012/0151238 A1    Jun. 14, 2012

(30) Foreign Application Priority Data

Dec. 8, 2010    (KR) ........................ 10-2010-0124976

(51) Int. Cl.
 G06F 1/00    (2006.01)
 G06F 1/32    (2006.01)
(52) U.S. Cl.
 CPC .................... *G06F 1/3275* (2013.01)
 USPC .......................................... 713/320; 713/323
(58) Field of Classification Search
 USPC ......... 713/1, 2, 100, 300, 310, 320, 321, 322, 713/323, 324, 330, 340, 375
 See application file for complete search history.

(56) References Cited

U.S. PATENT DOCUMENTS

| 5,805,910 | A | 9/1998 | Lee et al. | |
| 2008/0235528 | A1* | 9/2008 | Kim et al. | 713/324 |
| 2009/0089573 | A1* | 4/2009 | Kwon et al. | 713/2 |
| 2010/0106886 | A1* | 4/2010 | Marcu et al. | 711/102 |
| 2010/0318725 | A1 | 12/2010 | Kwon | |

FOREIGN PATENT DOCUMENTS

| KR | 10-0172003 B1 | 10/1998 |
| KR | 10-20060090088 A | 10/2006 |
| KR | 10-2009-0121405 A | 11/2009 |
| KR | 20100133649 | 12/2010 |
| KR | 10-1039397 | 5/2011 |

* cited by examiner

*Primary Examiner* — Kim Huynh
*Assistant Examiner* — Paul J Yen
(74) *Attorney, Agent, or Firm* — Volentine & Whitt, PLLC

(57) ABSTRACT

A memory link architecture (MLA) comprises a multi-port memory device, a memory controller, and a nonvolatile memory. The MLA can perform a sleep switching control operation or a memory management operation to reduce power consumption based on commands received from a host processor and/or automatic control methods.

19 Claims, 6 Drawing Sheets

REDUCING POWER CONSUMPTION IN MEMORY LINE ARCHITECTURE

CROSS-REFERENCE TO RELATED APPLICATIONS

This application claims priority under 35 U.S.C §119 to Korean Patent Application No. 10-2010-0124976 filed on Dec. 8, 2010, the subject matter of which is hereby incorporated by reference.

BACKGROUND OF THE INVENTION

Embodiments of the inventive concept relate generally to electronic memory technologies. More particularly, embodiments of the inventive concept relate to technologies for reducing power consumption in a memory link architecture.

It is common for electronic devices to include multiple processors and/or memories. For example, a portable electronic device may include a communication processor for performing communication functions, a multimedia processor for processing multimedia data, and so on. In addition, such a device may include a nonvolatile memory for mass data storage, and a volatile memory to be used as a working memory for one or more processors.

Various technologies have been developed to facilitate the interoperation of these multiple processors and memories. One such technology is a memory link architecture (MLA), which can create a link between two different memories via a processor. A typical MLA comprises a volatile memory device such as a dynamic random access memory (DRAM), a nonvolatile memory device such as a flash memory, and a memory controller connected between the volatile memory device and the nonvolatile memory device. The volatile memory device is typically a multi-port memory device that can be accessed simultaneously through different ports by the memory controller and another device, such as a host central processing unit (CPU). This allows the CPU to access the nonvolatile memory to execute processes, while simultaneously allowing the memory controller to transfer data between the volatile memory device and the nonvolatile memory device.

One drawback of conventional MLAs is that they may consume power unnecessarily when the flash memory is in a standby mode or when the CPU is not actively using the volatile memory. Accordingly, new techniques are needed to improve the power management of MLAs.

SUMMARY OF THE INVENTION

In one embodiment, a method is provided for operating an MLA comprising a multi-port memory device, a memory controller, and a nonvolatile memory. The method comprises performing a sleep switching control operation comprising determining whether the MLA has received a command from a host processor during a setup time, automatically switching the memory controller into a sleep mode upon determining that the MLA has not received a command from the host processor during the setup time, releasing the memory controller from the sleep mode upon receiving an input signal from the host processor, and switching the memory controller to an active mode upon releasing it from the sleep mode. In some embodiments, the method further comprises performing a memory management operation comprising determining whether the MLA has received a command indicating a storage mode or a standby mode, storing metadata and file data in the multi-port memory device and powering down a memory within the memory controller upon determining that the MLA has received the command indicating the storage mode, and storing metadata and file data in the multi-port memory device and powering down the multi-port memory device upon determining that the MLA has received the command indicating the standby mode.

In another embodiment, an MLA has a sleep mode, a storage mode, and a standby mode. The MLA comprises a multi-port memory device that stores metadata and file data during the storage mode, and is powered down during the standby mode, a memory controller that assumes a sleep state during the sleep mode of the MLA, and comprises a memory that stores metadata and file data during the standby mode, and is powered down during the storage mode, and a nonvolatile memory device controlled by the memory controller.

These and other embodiments can be used to reduce the amount of power consumed by an MLA.

BRIEF DESCRIPTION OF THE DRAWINGS

The drawings illustrate selected embodiments of the inventive concept. In the drawings, like reference numbers indicate like features.

DETAILED DESCRIPTION

Embodiments of the inventive concept are described below with reference to the accompanying drawings. These embodiments are presented as teaching examples and should not be construed to limit the scope of the inventive concept.

The terminology used herein is for the purpose of describing particular embodiments only and is not intended to be limiting of the inventive concept. As used herein, the singular forms "a", "an" and "the" are intended to encompass plural forms as well, unless the context clearly indicates otherwise. The terms "comprises" and/or "comprising," where used in this specification, indicate the presence of stated features, but do not preclude the presence or addition of other features. The term "and/or" indicates any and all combinations of one or more of the associated listed items.

Where a feature is referred to as being "connected to" another feature, it can be directly connected to the other feature, or intervening features may be present. In addition, where a feature is referred to as being "between" two other features, it can be the only feature between the two other features, or one or more intervening features may also be present.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and/or this description and will not be interpreted in an idealized or overly formal sense unless expressly so defined herein.

Figure 1:
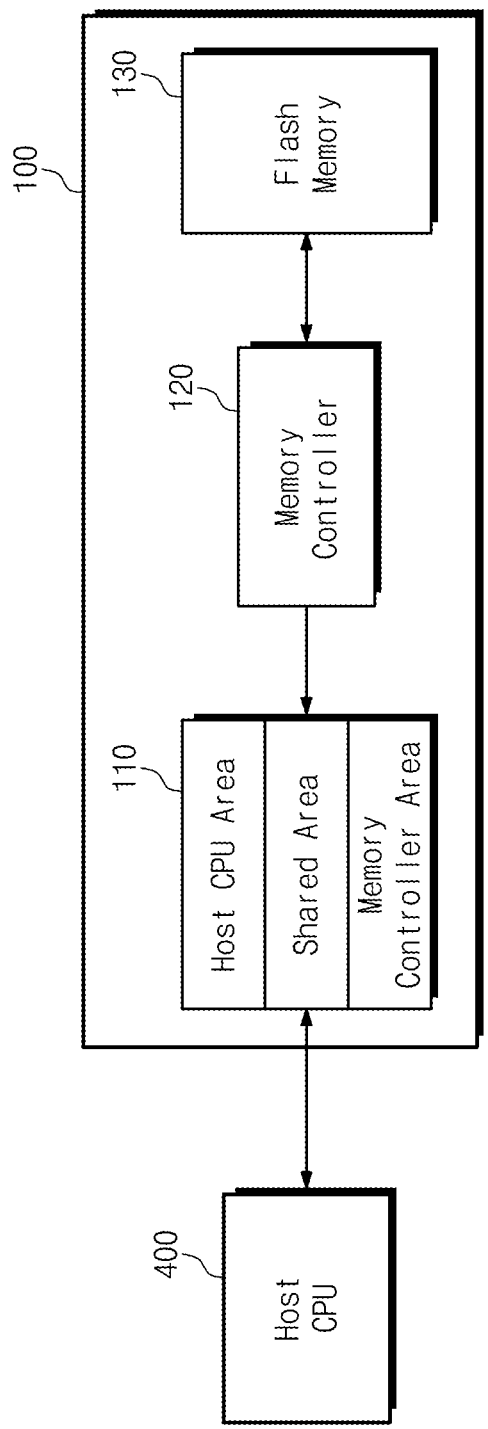
FIG. 1 is a block diagram illustrating an MLA according to an embodiment of the inventive concept.

FIG. 1 is a block diagram illustrating an MLA 100 according to an embodiment of the inventive concept.

Referring to FIG. 1, MLA 100 comprises a multi-port memory device 110, a memory controller 120, and a flash memory 130.

Multi-port memory device 110 comprises storage space divided into a host CPU area, a memory controller area, and a shared area. The host CPU area is used by a host CPU 400, the memory controller area is used by memory controller 120, and the shared area is shared by both host CPU 400 and memory controller 120.

During a standby mode of flash memory 130, multi-port memory device 110 may unnecessarily retain metadata and file data being executed or buffered, which can lead to unnecessary power consumption. In addition, MLA 100 is typically controlled to enter a sleep mode only if it receives a command CMD from host CPU 400, which can also lead to inefficient power management.

Figure 2:
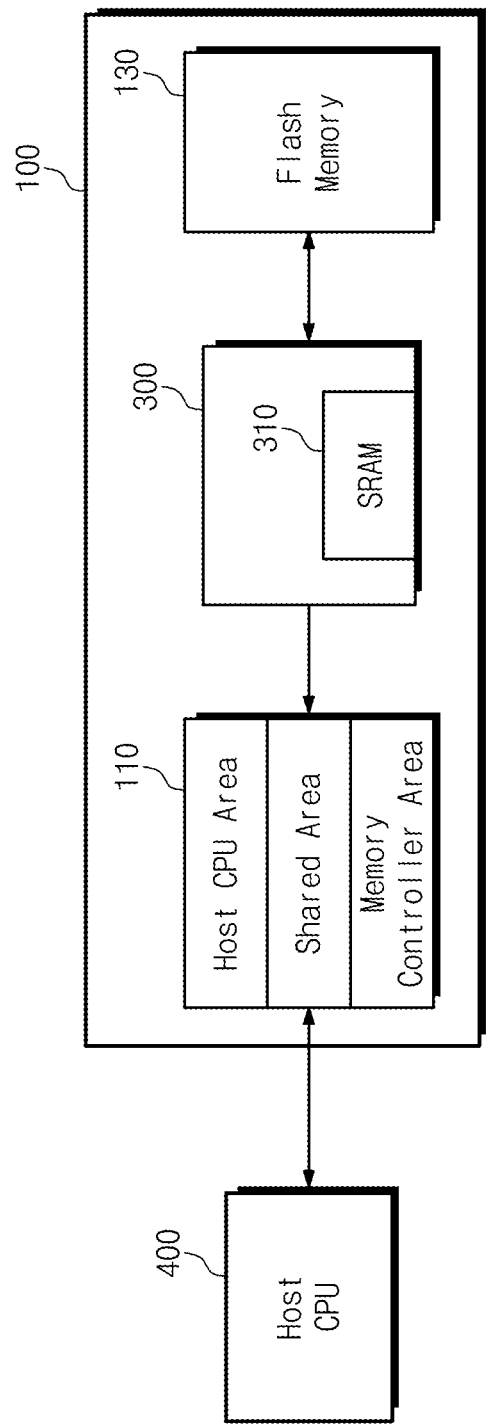
FIG. 2 is a block diagram illustrating an MLA according to an embodiment of the inventive concept.

FIG. 2 is a block diagram of MLA 100 according to another embodiment of the inventive concept.

Referring to FIG. 2, MLA 100 comprises multi-port memory device 110, a memory controller 300, and a flash memory 130. In certain embodiments, elements 110, 300, and 130 can be integrated in a single chip.

Memory controller 300 or a host CPU 400 comprises a counter (not shown), and memory controller 300 comprises an SRAM 310 for storing information. Flash memory 130 typically comprises a NAND flash memory or a NOR flash memory.

Multi-port memory device 110 stores a flash translation layer (FTL) code in a host CPU area, it stores file data in a memory controller area, and it stores a mapping table in a shared area.

MLA 100 can be controlled to make efficient use of power using a method comprising a sleep switching control step and a memory management step. In the sleep switching control step, MLA 100 is switched from an active mode to a sleep mode if no command is received from host CPU 400 within a predetermined time. In the memory management step, MLA 100 is switched to a storage mode or a standby mode.

Figure 3:
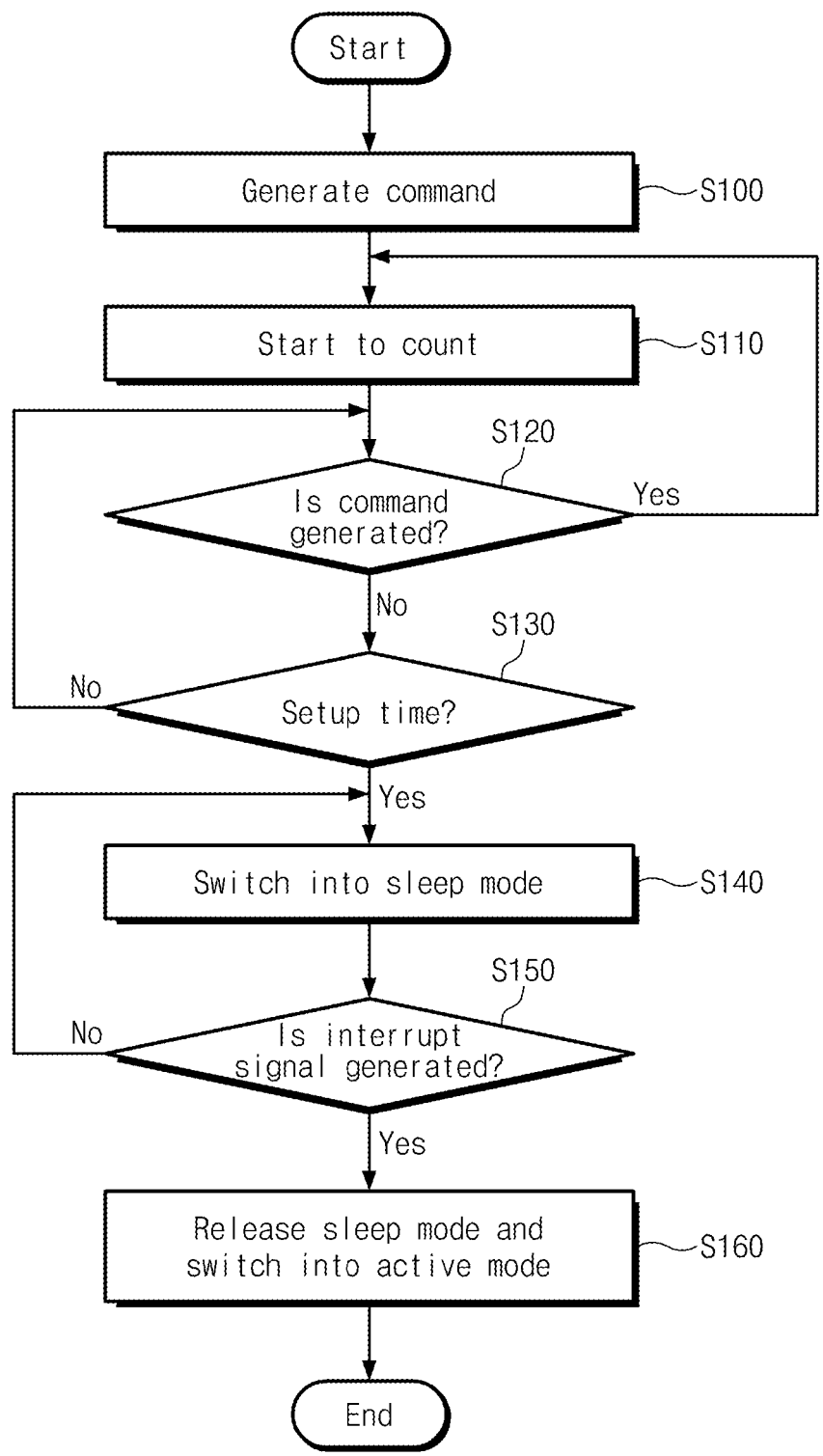
FIG. 3 is a flowchart illustrating a sleep mode switching control procedure of an MLA according to an embodiment of the inventive concept.

FIG. 3 is a flowchart illustrating a sleep mode switching control procedure of an MLA according to an embodiment of the inventive concept. For convenience, the method of FIG. 3 will be explained with reference to MLA 100 of FIG. 2. In the description that follows, example method steps will be indicated by parentheses to distinguish them from example device or system components.

Referring to FIG. 3, the method begins with host CPU 400 generating a command CMD and transmitting the command to MLA 100 (S100). Next, host CPU 400 or memory controller 300 controls a counter to start counting until a next command CMD is generated (S110).

Thereafter, MLA 100 determines whether a next command CMD has been generated since the starting of the counter (S120). If so (S120=Yes), the method returns to step S110 and the counter is restarted. Otherwise (S120=No), MLA 100 determines whether the counter has reached a setup time (S130). Where the counter has not reached the setup time (S130=No), the method returns to step S120. Otherwise (S130=Yes), a command CMD has not been generated within the setup time, so MLA 100 is switched into the sleep mode (S140). In general, the sleep mode can be initiated automatically through step S140, or in response to a sleep command from host CPU 400. During the sleep mode, memory controller 300 is placed in a sleeping state, which can be referred to alternatively as placing memory controller 300 in a sleep mode.

Next, MLA 100 determines whether host CPU 400 has generated an interrupt signal or a wake-up signal (S150). Where such a signal is detected (S150=Yes), MLA 100 is released from the sleep mode and placed in an active mode (S160). Accordingly, memory controller 300 is woken up, which can be referred to alternatively as releasing memory controller 300 from the sleep mode. Otherwise (S150=No), the method returns to step S140.

Figure 4:
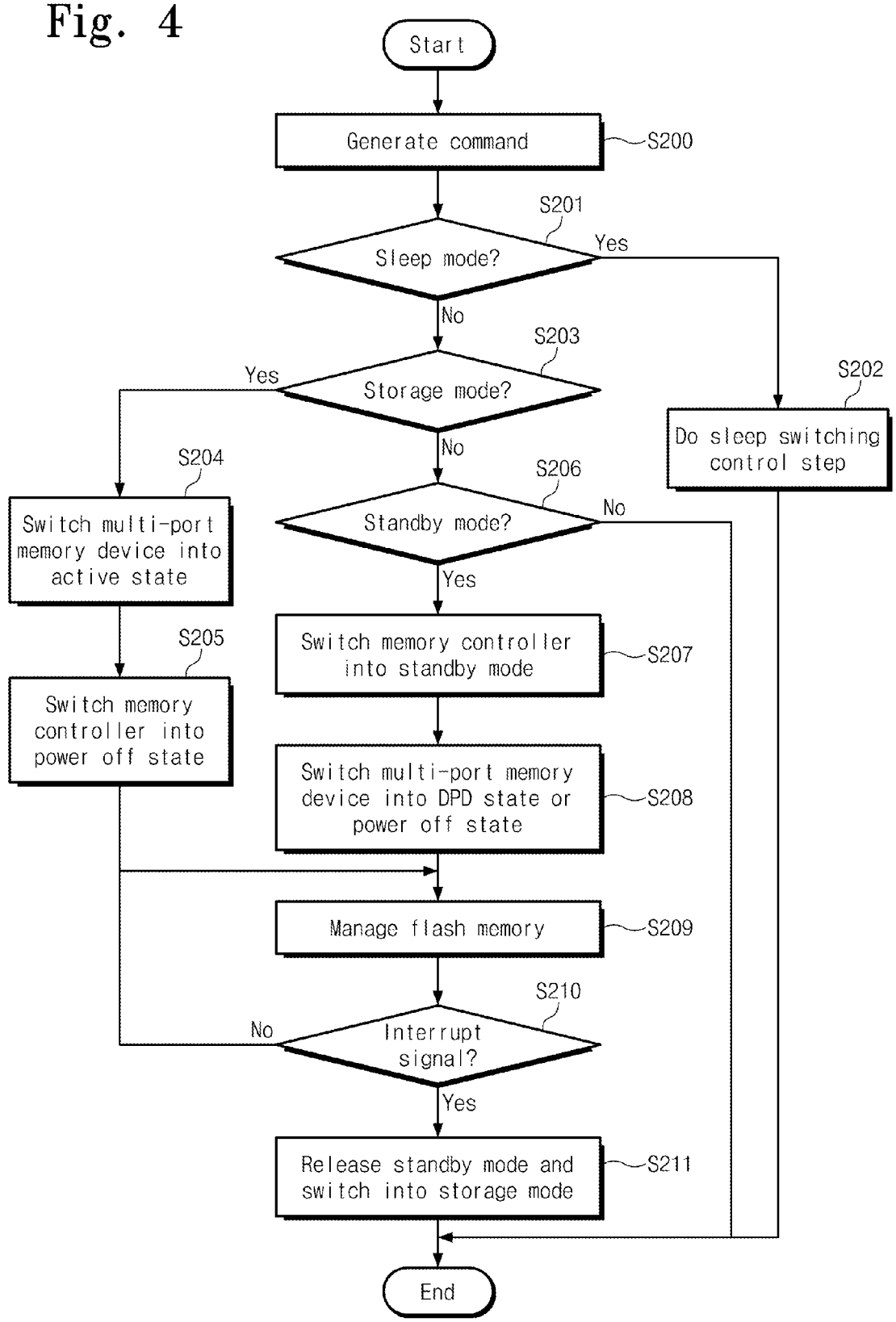
FIG. 4 is a flowchart illustrating a memory management control procedure of an MLA according to an embodiment of the inventive concept.
Figure 5A:
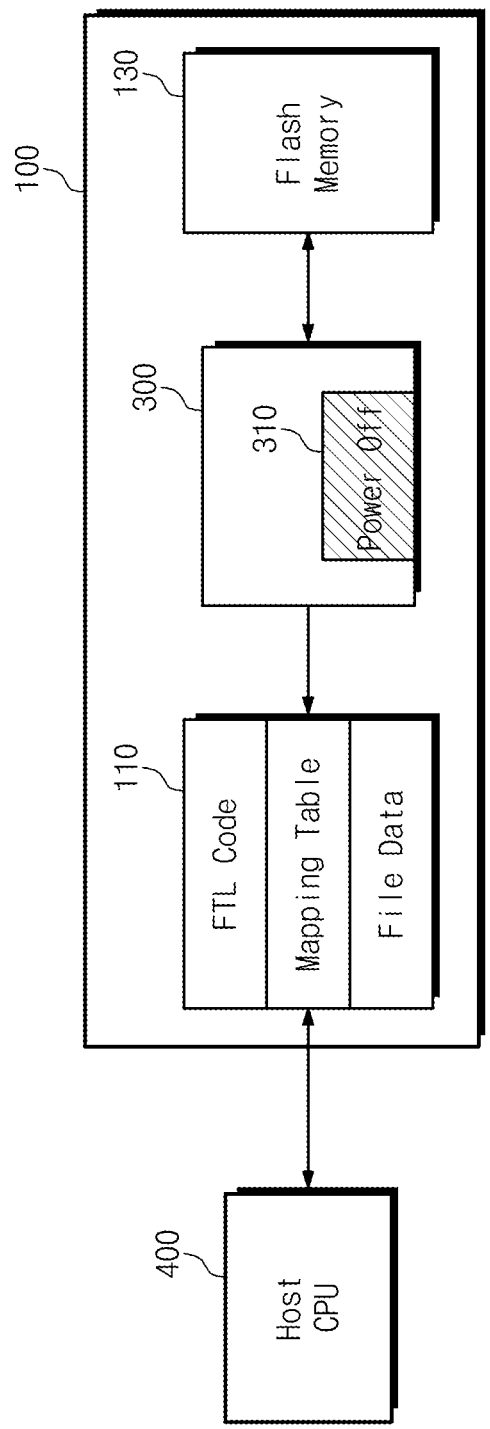
FIG. 5A is a block diagram illustrating a storage mode initiated by the memory management control procedure according to an embodiment of the inventive concept.
Figure 5B:
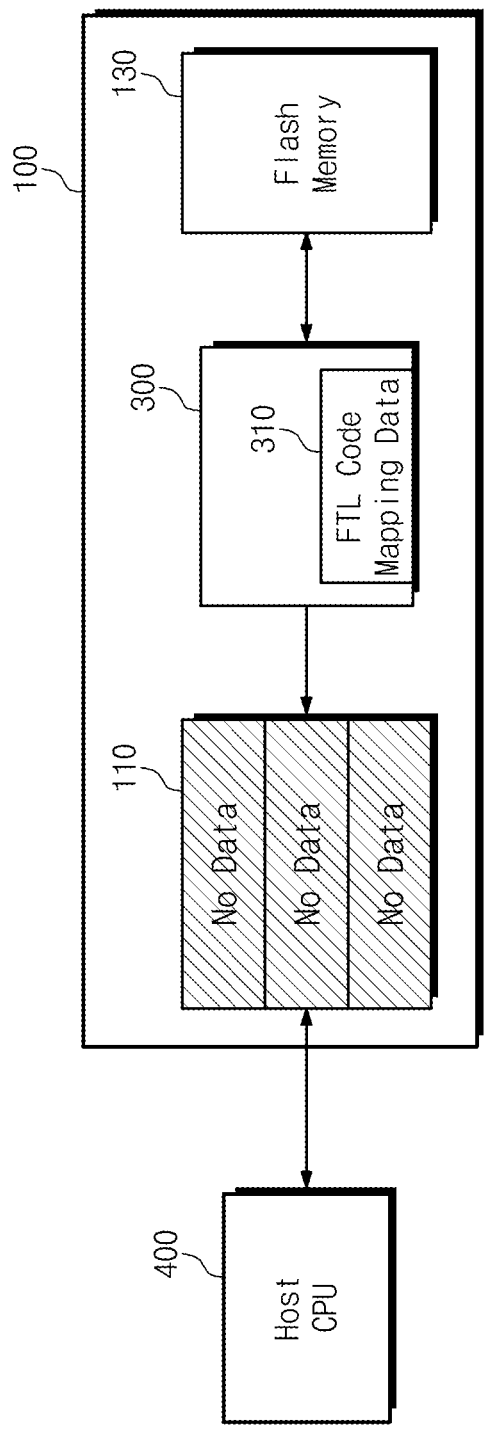
FIG. 5B is a block diagram illustrating a standby mode initiated by the memory management control procedure according to an embodiment of the inventive concept.

FIG. 4 is a flowchart illustrating a memory management control procedure of an MLA according to an embodiment of the inventive concept. FIG. 5A is a block diagram illustrating a storage mode initiated by the memory management control procedure according to an embodiment of the inventive concept. FIG. 5B is a block diagram illustrating a standby mode initiated by the memory management control procedure according to an embodiment of the inventive concept. For convenience, the method of FIG. 4 will be explained with reference to MLA 100 of FIG. 2.

Referring to FIG. 4, the method begins with host CPU 400 generating a command CMD and transmitting the command to MLA 100 (S200). Next, the method determines whether command CMD indicates that MLA 100 should enter a sleep mode (S201), a storage mode (S203), or a standby mode (S206).

If command CMD indicates that MLA 100 is to enter the sleep mode (S201=Yes), the sleep mode is initiated and a sleep mode switching control procedure is performed, such as that illustrated in FIG. 3 (S202). For instance, operation S140 or S160 may be performed in response to command CMD.

If command CMD indicates that MLA 100 is to enter the storage mode (S201=No and S203=Yes), the storage mode is initiated and metadata and file data are stored in multi-port memory device 110 at the same time. For instance, in the embodiment of FIG. 5A, an FTL code is stored in the host CPU area of multi-port memory device 110, file data is stored in the memory controller area of multi-port memory device 110, and a mapping table is stored in the shared area of multi-port memory device 110. In the storage mode, multi-port memory device 110 is switched into an active state (S204) and an SRAM 310 within memory controller 300 is placed in a power off state (S205). Thereafter, the method proceeds to a step S209 described below.

If command CMD indicates that MLA 100 is to enter the standby mode (S201=No, S203=No, and S206=Yes), the standby mode is initiated and metadata and file data are stored in SRAM 310 of memory controller 300 at the same time. For instance, in the embodiment of FIG. 5B, memory controller 300 is placed in a standby mode (S207), and multi-port memory device 110 switches into a deep power down (DPD) state or a power off state (S208). At this time, a minimum map table and FTL code are stored in SRAM 310 of memory controller 300.

Thereafter, flash memory 130 is managed using the metadata and file data stored in multi-port memory device 110 or memory controller 300 (S209). Next, an interrupt signal may be generated in response to a command generated by host CPU 400, and the presence of the interrupt signal can be detected by MLA 100 (S210). Upon detection of the interrupt signal (S210=Yes), the standby mode of step S207 is released and MLA 100 is placed in the storage mode (S211).

In the above methods, the power consumption of MLA 100 can be reduced by storing metadata and file data in SRAM 310 of memory controller 300 and powering down multi-port memory device 110 during the standby mode. In addition, the power consumption of MLA 100 can be further reduced by placing it in a sleep mode and suspending various operations of memory controller 300 based a on a count value maintained by host CPU 400 or memory controller 300.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method of operating a memory link architecture (MLA) comprising a multi-port memory device, a memory controller, and a nonvolatile memory, the method comprising:
   performing a sleep switching control operation comprising determining whether the MLA has received a command from a host processor during a setup time, automatically switching the memory controller into a sleep mode upon determining that the MLA has not received a command from the host processor during the setup time, releasing the memory controller from the sleep mode upon receiving an input signal from the host processor, and switching the memory controller to an active mode upon releasing it from the sleep mode;
   performing a memory management operation comprising determining whether the MLA has received a command indicating a storage mode or a standby mode, storing metadata and file data in the multi-port memory device and powering down a memory within the memory controller upon determining that the MLA has received the command indicating the storage mode, and storing metadata and file data in the memory controller and powering down the multi-port memory device upon determining that the MLA has received the command indicating the standby mode.

2. The method of claim 1, wherein the sleep switching control operation further comprises:
   starting a counter in response to an initial command transferred to the memory controller from the host processor, and periodically incrementing the counter until a next command is generated;
   determining whether the next command has been generated, before the counter reaches a value corresponding to the setup time;
   switching the memory controller into the sleep mode upon determining that the next command is not generated before the counter reaches the value.

3. The method of claim 1, wherein the input signal from the host processor is a wake-up signal from the host processor or a signal that causes an interrupt signal to be generated to release the memory controller from the sleep mode.

4. The method of claim 2, wherein the counter is located in the host processor or the memory controller.

5. The method of claim 1, wherein the memory management operation comprises:
   upon determining that the MLA has received a command indicating the storage mode, storing the metadata and file data in the multi-port memory device at the same time and placing the MLA in the storage mode;
   upon determining that the MLA has received a command indicating the standby mode, storing the metadata and file data in the memory controller at the same time and placing the MLA in the standby mode; and
   managing the nonvolatile memory using the metadata and file data stored in the multi-port memory device or the memory controller.

6. The method of claim 5, wherein the metadata and file data comprise a minimum map table and a flash translation layer (FTL) code.

7. The method of claim 5, further comprising, in the standby mode, switching the multi-port memory device into a deep power down state or a power off state.

8. The method of claim 5, further comprising, in the storage mode, switching the memory controller into a power off state and placing the multi-port memory device in an active mode.

9. The method of claim 5, further comprising, in the standby mode, releasing the standby mode in response to an interrupt signal generated in response to a command from the host processor.

10. The method of claim 1, wherein the multi-port memory device is a dynamic random access memory (DRAM) comprising a host processor area, a shared area, and a memory controller area.

11. The method of claim 1, wherein the host processor is a central processing unit.

12. The method of claim 1, wherein the nonvolatile memory is a NOR flash memory or a NAND flash memory.

13. A memory link architecture (MLA) having a sleep mode, a storage mode, and a standby mode, comprising:
   a multi-port memory device that stores metadata and file data during the storage mode and is powered down during the standby mode;
   a memory controller that assumes a sleep state during the sleep mode of the MLA and comprises a memory that stores metadata and file data during the standby mode and is powered down during the storage mode; and
   a nonvolatile memory device controlled by the memory controller.

14. The MLA of claim 13, wherein the sleep mode is initiated if the MLA does not receive a command from a host processor during a setup time.

15. The MLA of claim 14, wherein the memory controller comprises a counter that performs counting to determine whether command is received from the host processor during the setup time.

16. The MLA of claim 13, wherein the nonvolatile memory device is a flash memory device.

17. The MLA of claim 13, wherein the metadata and file data comprise a minimum map table and a flash translation layer (FTL) code.

18. The MLA of claim 14, wherein the memory controller is woken up from the sleep state in response to an interrupt signal generated in response to a signal from the host processor.

19. The MLA of claim 14, wherein the sleep mode is also initiated when the MLA receives a command indicating the sleep state.

* * * * *